June 11, 1957 G. F. SARGENT 2,794,999
APPARATUS FOR APPLYING FLUIDS TO SURFACES FROM
THE STORAGE CONTAINER FOR THE FLUIDS
Filed Aug. 14, 1953 2 Sheets-Sheet 1

INVENTOR.
GRAFTON F. SARGENT
BY Charles R. Fay
atty.

INVENTOR.
GRAFTON F. SARGENT
BY 2,794,999
Patented June 11, 1957

2,794,999

APPARATUS FOR APPLYING FLUIDS TO SURFACES FROM THE STORAGE CONTAINER FOR THE FLUIDS

Grafton F. Sargent, Fitchburg, Mass.

Application August 14, 1953, Serial No. 374,385

1 Claim. (Cl. 15—131)

This invention relates to a device for applying liquids or pastes to surfaces of any kind for the purpose of covering the surfaces with any protective or adhesive coating in the nature of tar, asphalt, wax, etc.

The objects of the invention include the provision of a device as described wherein the usual cover may be removed from the commercial container of the material to be applied and a substitute cover comprising a part of the invention substituted therefor, said substitute cover being provided with openings therein; and including means for securing an adjustable base in inverted position on said container with the substitute cover applied thereto, said base containing openings matching or selectively being misaligned with the openings in the substitute cover for the purpose of regulating the flow of the material to be applied very simply by rotating the base relative to the container and substituted cover, the base being provided with a flexible rim or spreader and the material gradually descending from the inverted container through the substituted cover and base to the surface to be processed and there being spread by the flexible spreader which is provided preferably in circumferential relationship to the aforementioned base.

The invention further contemplates additional parts of the invention including clamps for securing the substituted cover and embodying a new and improved handle, together with a new and improved handle for the base and including means to indicate the degree of opening of the alignable or mis-alignable openings in the substitute cover and the base, etc.

Other objects and advantages of the invention will appear hereinafter.

Reference is to be had to the accompanying drawings, in which.

Figure 1:
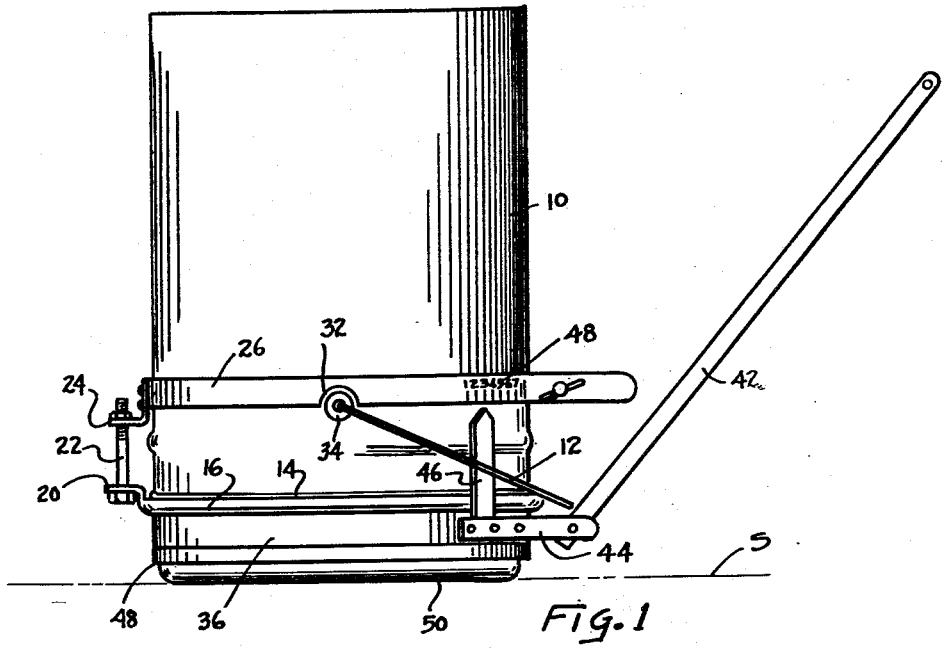
Fig. 1 is a view in side elevation of an apparatus according to the present invention.
Figure 2:
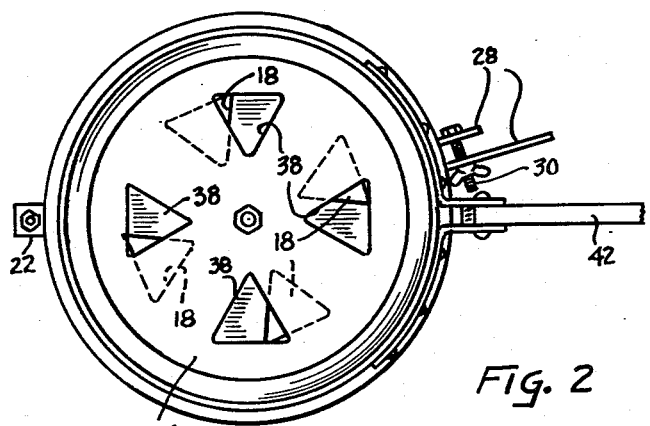
Fig. 2 is a bottom plan view thereof.

As shown in the drawings, the reference numeral 10 indicates a container which may be of the commercial barrel or bucket type obtainable on the market at the present time and containing material to be applied to a surface such as a floor or roof for protecting the same or for any other purpose. These containers are generally in the nature of a pail having a bail 12 by which it may be carried and the container is shown in inverted condition in the drawings.

These containers are ordinarily sold with a snap-in type cover or otherwise and this cover is contemplated as being removed in the present case and another novel cover is substituted therefor.

The substitute cover is made to completely cover the top opening of the container, the edge of which is indicated by the reference numeral 14, and thus the substitute cover is circular and is provided with a rim 16 setting down over the edge of the container at 14. The substitute cover is provided with openings generally indicated at 18 and these openings may be of any form or shape desired although it is found that the triangular shapes with the spaces thereof pointing towards a center is preferable.

This substitute cover is provided with an ear 20 which is apertured to receive a bolt 22, this bolt being engaged in an aperture in a bracket 24 on a circular band 26. This band is adapted to surround the container 10 but it is not continuous and it terminates in a pair of ears 28 which are secured together by a bolt 30, thus providing a clamp which may be tightly secured about the container 10, and in this manner the substitute cover is secured to the container. The band 26 is provided with notches 32 which receive the projections 34 providing journals for the bail 12 and this construction provides against relative rotary motion of the substitute cover relative to the container 10.

Figure 3:
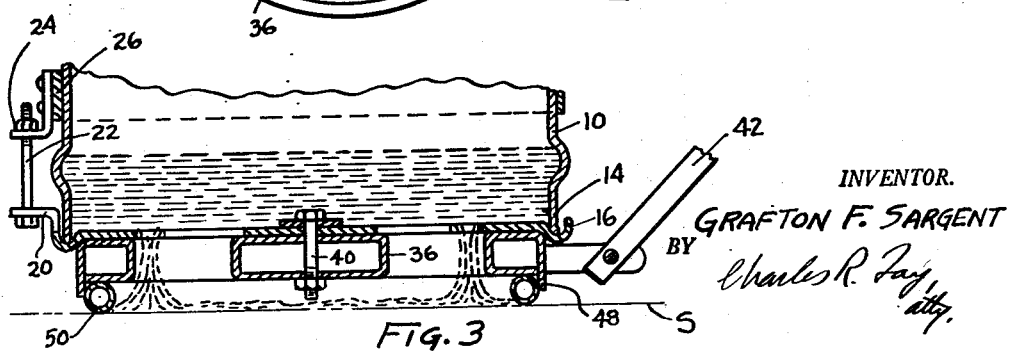
Fig. 3 is a vertical section on an enlarged scale.

The substitute cover has bolted thereto the base 36, base 36 being circular and having apertures therein at 38, which apertures are comparable to those at 18. The base 36 may be rotated relative to the container 10 and the substitute cover so as to misalign openings 18 and 38 to completely shut off the flow of material or these openings may be selectively gradually increasingly aligned to varying degrees so as to accurately control the flow of the material from the container to the surface S to be processed. A central bolt 40 provides an axle by which the base 36 may be swung relative to the substitute cover and the base 36 may be made of any construction but is preferably built up in box-like form as shown in Fig. 3 to provide for stability and long-lasting qualities under conditions of hard-usage.

The base 36 is provided with a handle 42 mounted to pivot on a bracket 44, the latter providing a supporting means for a pointer 46 accompanied with indicia 48 on the band 26 in order to indicate the relative rotation of the base 36 relative to the substitute cover to generally indicate the degree of opening of the combined apertures at 18 and 38, and thus it is easy to determine what openings should be used for different kinds of materials.

The base 36 may be provided with a depending circumferential flange at 48 and within this flange there is located an applicator 50 which is a circular rubber tube or other flexible material which bears upon the surface S preventing contact of the middle parts of the applicator with the surface and at the same time providing flexible means ensuring a smooth free-flowing spreading action of the material being used, so that the roof, floor or the like receives a uniform coating of the material applied at all points, regardless of unevenness encountered in the surface. This of course provides a great saving in the material, since if it is applied with a mop or brush, the coating applied will be uneven, and it has been found that the present invention saves as much as one-third the contents of each container 10.

Accurate adjustment of the flow may be attained and the operator is thereby practically forced to provide a smooth, even coating of material and at the same time the actual time of application is greatly reduced due to the fact that all that is necessary to do is to pull the device along the surface until the container 10 is empty, whereupon the device may be applied to a new container and the process continued or the first container may be repeatedly refilled through the openings 18 and 38.

The flexible rim or tube 50 serves to confine the liquid or paste and to produce the smooth, even uniform layer of protective material as described. The flexibility of the spreader 50 is of course controlled by varying its composition, depending upon the material to be used, or it may also be pumped up with air like a vehicle tube so as to control its flexibility or stiffness.

Figure 4:
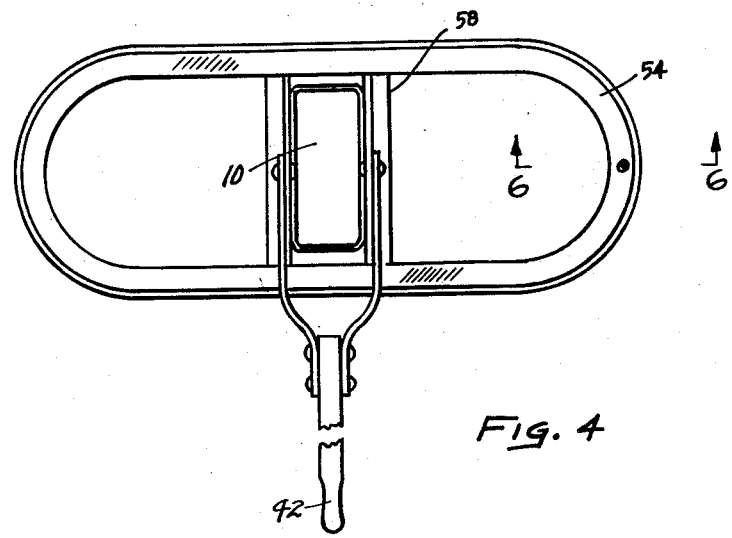
Fig. 4 is a diagrammatic view of a modified spreader.
Figure 5:
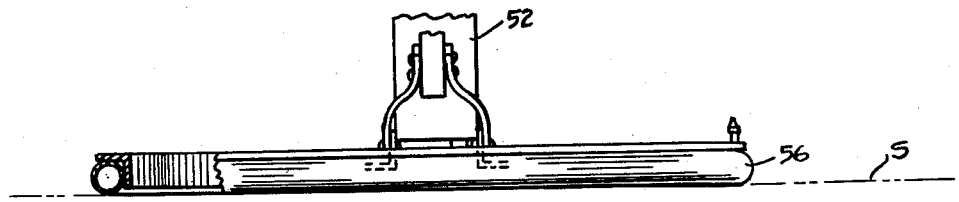
Fig. 5 is a front view of the spreader of Fig. 4.
Figure 6:
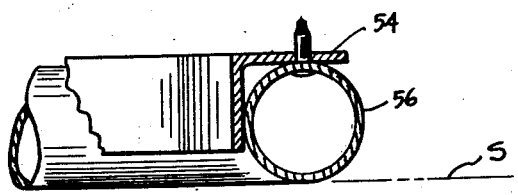
Fig. 6 is an enlarged section on line 6—6 in Fig. 4.

The hose 50 may assume many different shapes and it need not be circular but may be oval or elongated in order to provide for a wider path processed than would otherwise be the case and this is diagrammatically shown in Fig. 4 wherein the container is shown at 52 but the applied spreader, indicated at 54, is shown to extend widely laterally thereof so as to provide a spreading path between the lines 56 rather than a comparatively narrow path between the lines 58. The configuration shown in Fig. 4 is intended merely to illustrate the fact that containers of various shapes may be utilized in the present invention by making changes in the shape of the holder; and it is intended also that the shape of the spreader in Fig. 4 shall apply to the cylindrical container 10 of Fig. 1.

Having thus described my invention and the advantages thereof, I do not wish to be limited to the details herein disclosed, otherwise than as set forth in the claim, but what I claim is:

A device of the class described for spreading roofing materials comprising a cover member adapted to be substituted for the original cover of a container for spreadable roofing material, said substitute cover having apertures therein, a band for encompassing the container, means to tighten the band to the container, means connecting the substitute cover to the band, a base having apertures therein, said base being rotatable on said substitute cover for mis-alignment or graduated alignment of said apertures to provide a controlled flow of the roofing material with the device in inverted condition upon the base, a spreading element attached to said base, a pointer on the base and indicia on the clamping band for indicating the relative degree of alignment of the said apertures and an external handle secured to the base to actuate the same, said handle extending vertically upwards in inverted position of the container.

References Cited in the file of this patent

UNITED STATES PATENTS

| | | |
|---|---|---|
| 1,056,538 | Hawes | Mar. 18, 1913 |
| 1,226,722 | Sullivan | May 22, 1917 |
| 1,447,117 | Balison et al. | Feb. 27, 1923 |
| 1,479,281 | Buck | Jan. 1, 1924 |
| 2,250,177 | Boccasile | July 22, 1941 |
| 2,505,611 | Ellinger | Apr. 25, 1950 |
| 2,622,258 | Giraud | Dec. 23, 1952 |

FOREIGN PATENTS

| | | |
|---|---|---|
| 31,126 | France | Aug. 31, 1926 |
| | (1st addition to No. 591,836) | |
| 382,910 | Great Britain | Nov. 3, 1932 |
| 479,448 | Great Britain | Feb. 7, 1938 |